US008176538B2

(12) United States Patent
Kigo et al.

(10) Patent No.: US 8,176,538 B2
(45) Date of Patent: May 8, 2012

(54) INFORMATION PROCESSING SYSTEM, RECORDING MEDIUM STORING CONTROL PROGRAM, AND COMPUTER DATA SIGNAL EMBODIED IN A CARRIER WAVE

(75) Inventors: Kenichiro Kigo, Kanagawa (JP); Hisashi Nakatsuyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1419 days.

(21) Appl. No.: 11/603,835

(22) Filed: Nov. 24, 2006

(65) Prior Publication Data

US 2008/0005789 A1  Jan. 3, 2008

(30) Foreign Application Priority Data

Jun. 28, 2006 (JP) ................................. 2006-178036

(51) Int. Cl.
*G06F 7/04* (2006.01)
*H04L 9/32* (2006.01)
(52) U.S. Cl. .......................................... 726/8; 713/170
(58) Field of Classification Search ................ 726/8, 12, 726/14, 17–21, 27; 713/170
See application file for complete search history.

(56) References Cited

U.S. PATENT DOCUMENTS

| 6,263,432 | B1* | 7/2001 | Sasmazel et al. | 713/100 |
|---|---|---|---|---|
| 6,298,383 | B1* | 10/2001 | Gutman et al. | 709/229 |
| 7,113,994 | B1* | 9/2006 | Swift et al. | 709/229 |
| 7,194,547 | B2* | 3/2007 | Moreh et al. | 709/229 |
| 7,353,383 | B2* | 4/2008 | Skingle | 713/156 |
| 7,540,022 | B2* | 5/2009 | Barari et al. | 726/10 |
| 7,565,554 | B2* | 7/2009 | Joosten et al. | 713/193 |
| 7,793,342 | B1* | 9/2010 | Ebrahimi et al. | 726/8 |
| 2004/0128546 | A1* | 7/2004 | Blakley et al. | 713/201 |
| 2005/0021956 | A1* | 1/2005 | Genty et al. | 713/170 |
| 2005/0251855 | A1* | 11/2005 | Brandstatter | 726/12 |
| 2006/0005237 | A1* | 1/2006 | Kobata et al. | 726/12 |

(Continued)

FOREIGN PATENT DOCUMENTS

JP        10-269184 A       10/1998

(Continued)

OTHER PUBLICATIONS

Japanese Office Action dated Aug. 16, 2011 in corresponding Japanese Application No. 2006-178036.

*Primary Examiner* — Nathan Flynn
*Assistant Examiner* — Abdullah Almamun
(74) *Attorney, Agent, or Firm* — Sughrue Mion, PLLC

(57) ABSTRACT

An information processing system, which includes: an information distribution server; a client apparatus; and a plurality of service providing servers that provide service to a user of the client apparatus, and the information distribution server including: a user authentication information memory that stores user authentication information; a receiving section that receives authentication information from the plurality of service providing servers; and an authentication proxy information distributing section that distributes authentication proxy information prepared based on the user authentication information and the authentication information, and the client apparatus including: a user authentication section that carries out authentication of the user, and an authentication proxy section that, if the authentication is carried out by the user authentication section, executes a proxy authentication when the user accesses at least one of the plurality of service providing servers on the basis of the distributed authentication proxy information.

9 Claims, 5 Drawing Sheets

U.S. PATENT DOCUMENTS

| | | | |
|---|---|---|---|
| 2006/0048216 A1* | 3/2006 | Hinton et al. | 726/8 |
| 2006/0101510 A1* | 5/2006 | Kadyk et al. | 726/12 |
| 2006/0195893 A1* | 8/2006 | Caceres et al. | 726/8 |
| 2006/0230438 A1* | 10/2006 | Shappir et al. | 726/8 |
| 2006/0265740 A1* | 11/2006 | Clark et al. | 726/8 |
| 2006/0282662 A1* | 12/2006 | Whitcomb | 713/156 |
| 2007/0118513 A1* | 5/2007 | Iwasaki et al. | 707/3 |
| 2008/0163337 A1* | 7/2008 | Tuliani et al. | 726/2 |

FOREIGN PATENT DOCUMENTS

| | | |
|---|---|---|
| JP | 2002-334056 A | 11/2002 |
| JP | 2004-151863 A | 5/2004 |
| JP | 2004-536359 A | 12/2004 |
| JP | 2005-321970 A | 11/2005 |
| JP | 2006-120130 A | 5/2006 |

* cited by examiner

| NAME OF SERVICE | ID | PASSWORD | URL |
|---|---|---|---|
| SSO INFORMATION DISTRIBUTION SERVER | 0001 | abcd | http://sso.aaa.bbb |
| SERVICE PROVIDING SERVER A | ABCD | hz+9aKL | http://service-a.xxx.yyy |
| SERVICE PROVIDING SERVER N | fa93hgt | fa93hgt | http://service-b.ppp.qqq |
| ⋮ | ⋮ | ⋮ | ⋮ |

FIG.3

INFORMATION PROCESSING SYSTEM, RECORDING MEDIUM STORING CONTROL PROGRAM, AND COMPUTER DATA SIGNAL EMBODIED IN A CARRIER WAVE

BACKGROUND

1. Technical Field

The present invention relates to an information processing system, a recording medium storing a control program, and a computer data signal embodied in a carrier wave.

2. Related Art

An SSO (Single Sign-On) system with which, once the user receives authentication at first, the user can utilize all the functions which are enabled by that authentication has been proposed.

In a case where a network system is operated in schools, enterprises, and the like, a proxy server which carries out connection to an external network as a proxy of a computer on an internal network is provided at the boundary between the internal network and the external network (for example, the Internet) in order to enhance the security. This proxy server is intended to utilize a server on the external network from the internal network, and in sometimes, is particularly called a forward proxy.

Contrarily to this, a reverse proxy relays a connection from the external network to the internal network as opposed to the forward proxy relaying connection from the internal network to the external network. The application for the reverse proxy is not limited to connection from the external network to the internal network, but it is not unusual that the reverse proxy is used in the same network.

SUMMARY

A first aspect of the present invention provides an information processing system, which includes: an information distribution server; a client apparatus; and a plurality of service providing servers that provide service to a user of the client apparatus, and the information distribution server including: a user authentication information memory that stores user authentication information; a receiving section that receives authentication information from the plurality of service providing servers; and an authentication proxy information distributing section that distributes authentication proxy information prepared based on the user authentication information and the authentication information, and the client apparatus including: a user authentication section that carries out authentication of the user, and an authentication proxy section that, if the authentication is carried out by the user authentication section, executes a proxy authentication when the user accesses at least one of the plurality of service providing servers on the basis of the distributed authentication proxy information.

BRIEF DESCRIPTION OF THE DRAWINGS

An exemplary embodiment of the present invention will be described in detail based on the following figures, wherein:

FIG. 3 is a chart illustrating one example of authentication proxy information as shown in FIG. 2;

DETAILED DESCRIPTION

Hereinbelow, an exemplary embodiment of an information processing system, a recording medium storing a control program, and a computer data signal embodied in a carrier wave pertaining to the present invention will be described in detail with reference to the attached drawings.

Figure 1:
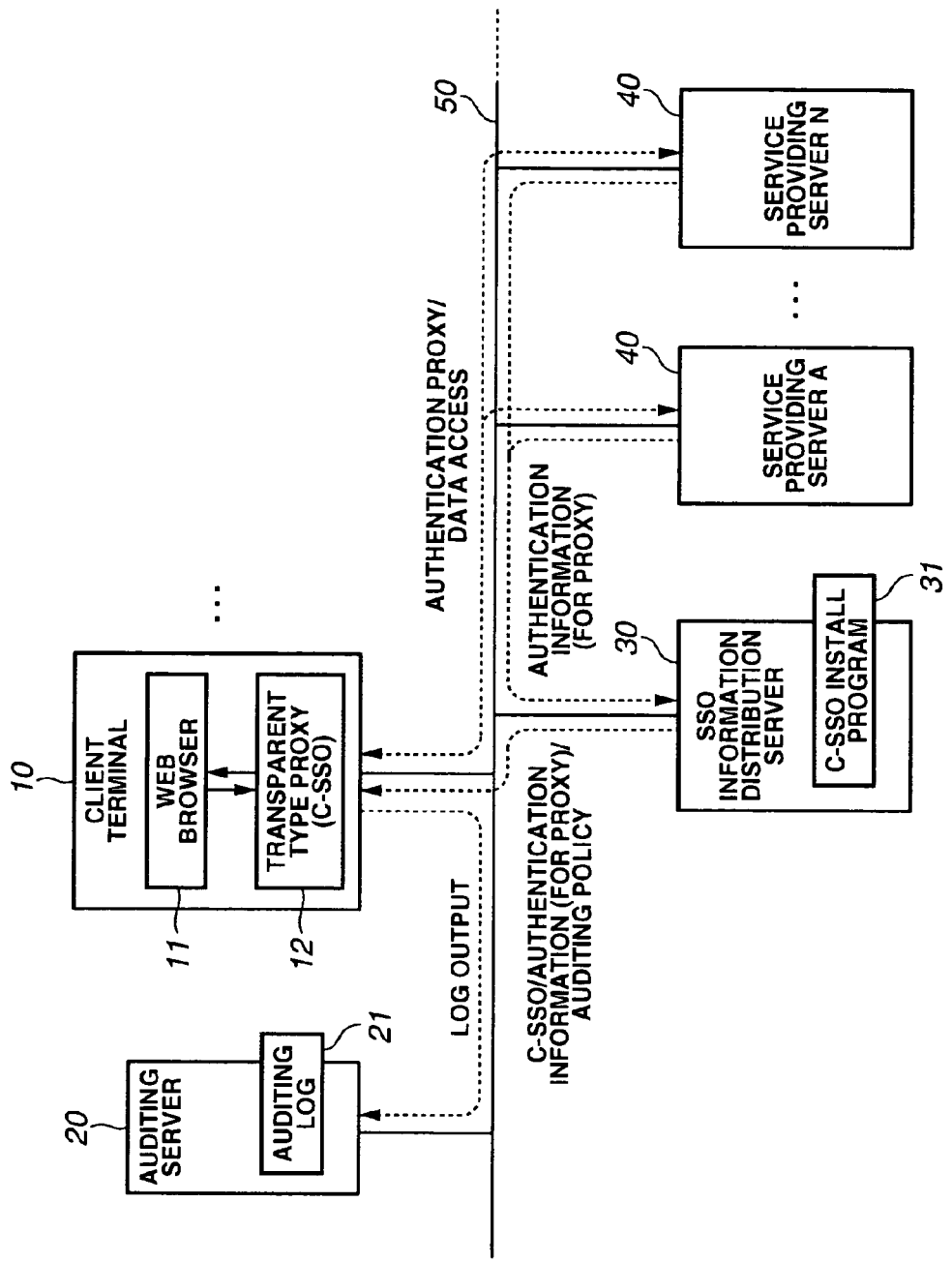
FIG. 1 is a chart illustrating one example of an entire configuration of an information processing system pertaining to the present invention.

FIG. 1 is a chart illustrating one example of an overall configuration of the information processing system pertaining to the present invention.

In this information processing system, one or more than one client terminals 10, an auditing server 20, an SSO information distribution server 30, and one or more than one service providing servers 40 are connected to one another through a network 50 constituted by a LAN (Local Area Network), a WAN (Wide Area Network), and the like. In this information processing system, an SSO scheme is realized under control of an SSO program (hereinafter referred to as C-SSO) by a transparent type proxy disposed in the client terminal 10. In other words, once an authentication is validly carried out, this C-SSO 12 carries out the proxy authentication for the respective service providing servers 40, whereby thereafter, if the user accesses any of the service providing servers 40 which participate in the SSO scheme, the user will not be requested of authentication. The network configuration in this information processing system is only one example, and on the network 50, various other network terminals, such as an application server, a Web server, and the like, may be connected.

Herein, in the SSO information distribution server 30, a C-SSO install program 31 for installing the C-SSO 12 in the client terminal 10 is stored, and by this program 31, the C-SSO 12 is installed in the client terminal 10.

In addition, later described in detail, this C-SSO 12 executes authentication to a service providing server 40 as a proxy, thus the C-SSO 12 needs to hold authentication information for carrying out authentication to the service providing server 40. Therefore, the SSO information distribution server 30 receives authentication information to log in to a particular service providing server 40 from the service providing server 40, and further distributes this authentication information to the client terminal 10 where the C-SSO 12 is installed.

In the client terminal 10, a Web browser 11 for reading the HTML contents, and the like, is provided as an application, and by using this Web browser 11, data communication with the service providing server 40, or the like, is realized. In this exemplary embodiment, a case where data communication with the service providing server 40, or the like, is carried out through the Web browser 11 described as an example, however, in such communication, the Web browser 11 need not always be used, and any other software may be used instead, provided that it utilizes the http request.

In accessing the service providing server 40 with the Web browser 11, the access is carried out via the C-SSO 12. This is because the C-SSO 12 intercepts the request from the Web browser 11. In referring to the service providing server 40 from the Web browser 11, it seems to the user as if the user directly accesses the server, however, actually the access is carried out via this C-SSO 12. In addition, the auditing server 20 receives the access recording, and the like, on this client terminal 10 as an auditing log 21, and stores it. In sending the auditing log 21 to this auditing server 20, acquiring and sending of the auditing log 21 is carried out by the C-SSO 12.

The service providing server 40 stores various types of information, such as HTML contents, images, and the like, and resources, such as Web applications, and the like, and provides such information, or the like, responding to the http request from the client terminal 10 through the Web browser 11. This service providing server 40 stores static contents (for example, HTML contents, or the like) and dynamic contents (Web applications, or the like), and includes functions of both the Web server and the application server, however, this is only one example, and the server may include either one of the functions.

Herein, for easier description, the operation carried out when the client terminal 10 participates in the SSO scheme will be briefly described. When access from the client terminal 10 to a particular service providing server 40 is performed for the first time, it is required that the authentication be carried out first of all. Herein, the authentication information for logging in to this service providing server 40 is periodically sent from the service providing server 40 to the SSO information distribution server 30. This periodical sending may occur every time a certain time or period elapses, for example, or every time an alteration of the authentication information is given.

The request from the client terminal 10 is redirected to the SSO information distribution server 30. By this redirection, installation of the C-SSO 12 from the SSO information distribution server 30 to the client terminal 10 is requested. The C-SSO 12 may be previously installed by the user getting access to the install page.

When the user accepts this install request, and the C-SSO 12 is installed in the client terminal 10, the SSO information distribution server 30 sends the encoded authentication proxy information and the auditing policy to the client terminal 10.

When, after logging in to the C-SSO 12, the user uses the Web browser 11 for trying back to access the service providing server 40, the C-SSO 12 intercepts this request to execute authentication as a proxy for the service providing server 40. Herein, in a case where the authentication is successfully performed, the processing in accordance with the user's request is carried out in the service providing server 40. The contents of such processing carried out on the client terminal 10 is sent to the auditing server 20 on the basis of the auditing policy.

Next, with reference to FIG. 2, a part of the functional configuration of the information processing system as shown in FIG. 1 will be described. The same components as those given in FIG. 1 is provided with the same numerals and signs.

The service providing server 40 is configured to include, as a various processing function section, an authentication information sending section 41 which provides the function of sending authentication information for logging in to its own terminal to the SSO information distribution server 30, and an authentication section 42 which provides the function of carrying out the authentication determination about whether the logging in to its own terminal is to be enabled or not. The authentication information sent from this authentication information sending section 41 is sent, being encoded from the viewpoint of security.

The SSO information distribution server 30 is configured to include, as a various processing function section, a C-SSO install program, an SSO information distributing section 32, a user authentication information memory 33, and an authentication information receiving section 34.

The authentication information receiving section 34 provides the function of receiving the authentication information from the service providing server 40, and the user authentication information memory 33 provides the function of storing the user authentication information. The SSO information distributing section 32 provides the function of preparing authentication proxy information according to the request from the client terminal 10 on the basis of the authentication information received from the service providing server 40 and the user authentication information stored in the user authentication information memory 33, and distributing it to the client terminal 10. In addition, the SSO information distributing section 32 distributes the auditing policy, besides this authentication proxy information, to the client terminal 10 according to the request from the client terminal 10. In distributing the authentication proxy information and the auditing policy to the client terminal 10, these are encoded in the same manner as in sending the authentication information from the service providing server 40 to the SSO information distribution server 30. The management and transportation methods for the key to be used in encoding and decoding, and what encoding method is adopted is no critical problem, and any method may be used, provided that the security can be maintained.

In the client terminal 10, the Web browser 11, various programs 13, and the C-SSO 12 are installed, herein, the C-SSO 12 is configured to include, as a various processing function section, a user authentication section 61, a request acquiring section 62, an SSO information acquiring section 63, an authentication proxy section 64, and a log output section 65.

The user authentication section 61 provides the function of carrying out authentication for logging in to the C-SSO 12. In utilizing the SSO scheme, the user is required to carry out user authentication between this user authentication section 61 and the user to log in to the C-SSO 12. In the present exemplary embodiment, the user authentication in the user authentication section 61 is carried out on the basis of the user authentication information stored in the user authentication information memory 33.

The request acquiring section 62 provides the function of intercepting and acquiring a request from the Web browser 11 and a response to the Web browser 11 for that request. In other words, a particular request from the Web browser 11 and the response therefor are always passed through the C-SSO 12.

The SSO information acquiring section 63 acquires information distributed from the SSO information distributing section 32 of the SSO information distribution server 30. Specifically, the SSO information acquiring section 63 requests the SSO information distribution server 30 to distribute the information required in participating in the SSO scheme, such as the authentication proxy information 64a, the auditing policy 65a, and the like, and acquires the information distributed according to that request to pass it to the authentication proxy section 64 and the log output section 65.

The authentication proxy section 64 provides the function of using the authentication proxy information 64a for carrying out authentication to the respective service providing servers 40 in place of the user. One example of this authentication proxy information 64a is as shown in FIG. 3, for example. This authentication in the authentication proxy section 64 is carried out without the user being caused to be aware thereof.

The log output section 65 provides the function of outputting a log indicating various processing contents on the basis of the auditing policy 65a to the auditing server 20. Herein, the auditing policy 65a provides the rules which mean at what timing the log is to be outputted, what log is to be collected, and the like. By distributing this auditing policy 65a to the C-SSO 12 installed from the SSO information distribution server 30 in the respective client terminals 10, the policy for the entire system can be easily rendered uniform. In addition, simply by rewriting the auditing policy 65a, the contents of the auditing log which is collected can be easily altered. In this exemplary embodiment, description will be given on the assumption that the auditing policy 65a prescribes that the log is to be collected at the time when a request is received from the Web browser 11, and after that request.

The auditing policy 65a is stored, being encoded, or otherwise protected, such that the user cannot easily alter it. In addition, the auditing policy 65a is downloaded from the SSO information distribution server 30 at the time of installation of the C-SSO 12, distribution of authentication proxy information, or the like. In operating this above-mentioned C-SSO 12 on the client terminal 10, there is no need for carrying out special setting with the Web browser 11, or the like. This is because the C-SSO 12 is realized as a transparent type proxy.

Figure 2:
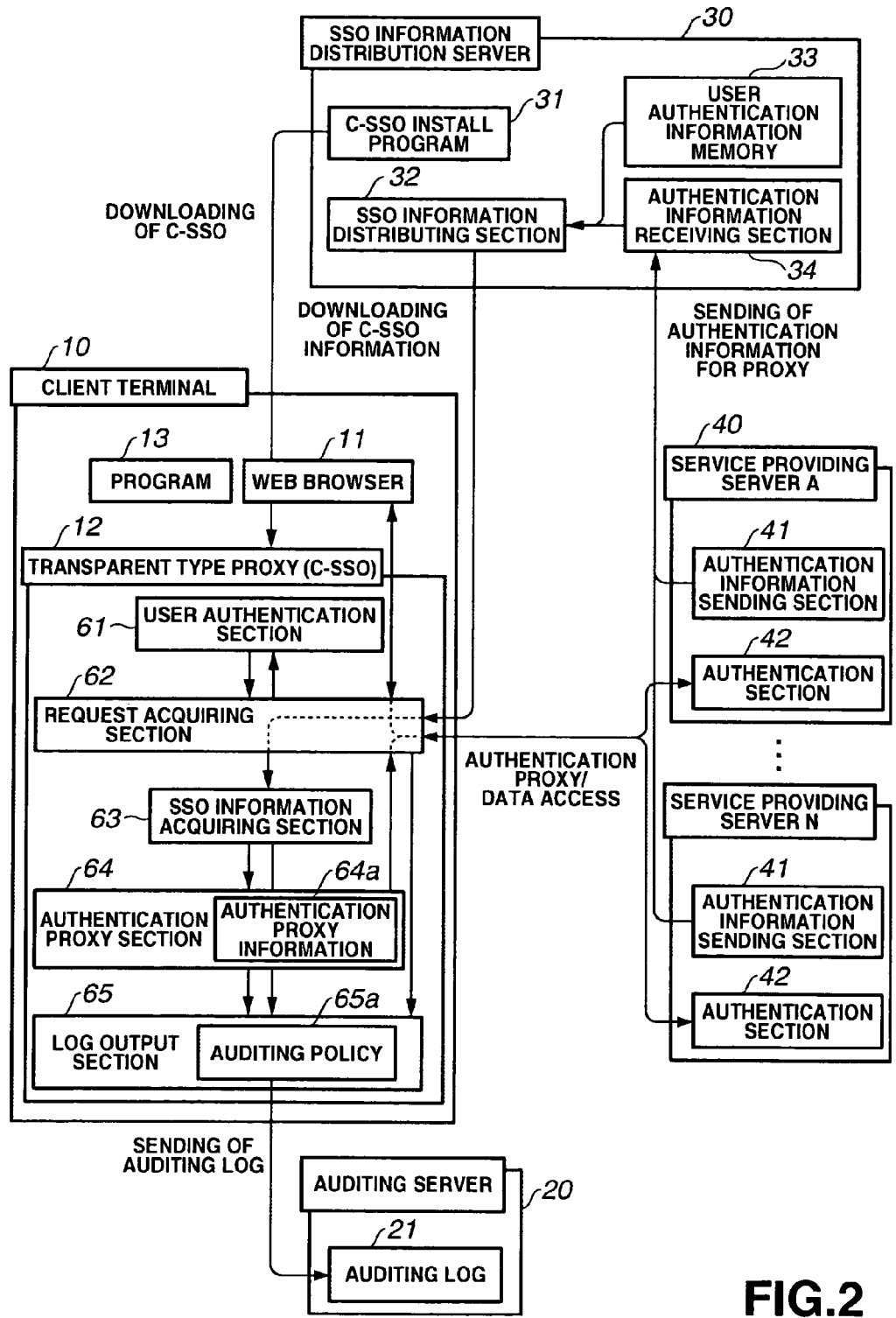
FIG. 2 is a chart illustrating a part of a functional configuration of the information processing system as shown in FIG. 1.

Next, with reference to FIG. 4, the flow of processing in the information processing system as shown in FIG. 1 and FIG. 2 will be described. Here, the flow of processing from the state in which the C-SSO 12 is not installed in the client terminal 10 will be described.

First, from the authentication information sending section 41 of the service providing server 40 to the SSO information distribution server 30, the authentication information is sent, and the authentication information receiving section 34 of the SSO information distribution server 30 receives it (in step S101).

Next, the user accesses the SSO information distribution server 30 from the client terminal 10, using the Web browser 11 (in step S102), then the SSO information distribution server 30 references the Cookie, or the like, to detect that the C-SSO is not yet installed in the client terminal 10, requesting the user to implement the C-SSO install program 31 (in step S103). By previously setting the system such that, even in case where, before the C-SSO 12 being installed, the user directly accesses the service providing server 40 from the client terminal 10, the user is redirected to the SSO information server 30, the user is requested to install the C-SSO 12 in the same manner as in the case where the user accesses the SSO information distribution server 30 at first.

When the user approves installation, the installation of the C-SSO 12 into the client terminal 10 is started (in step S104). Here, when the installation into the client terminal 10 is completed, the information including the authentication proxy information 64a and the auditing policy 65a is sent, being encoded, from the SSO information distributing section 32 of the SSO information distribution server 30 to the C-SSO 12 on the request from the SSO information acquiring section 63 of the C-SSO 12 (in step S105). The C-SSO 12 acquires this with the SSO information acquiring section 63, and passes the authentication proxy information 64a to the authentication proxy section 64, and the auditing policy 65a to the log output section 65 (in step S106).

When the installation of the C-SSO 12 is completed, and the user tries to access the service providing server 40, using the Web browser 11 (in step S107), the C-SSO 12 intercepts this request with the request acquiring section 62. If, at this time, the logging in to the C-SSO 12 is not completed, the user authentication section 61 displays a popup, or otherwise operates, to request the user to log in to the C-SSO 12 (in step S108).

The user inputs the user authentication information, such as an account, a password, and the like, (in step S109), and directs implementation of the user authentication. Here, when the authentication is successfully carried out (in step S110), the logging in to the C-SSO 12 is achieved.

Then, when the C-SSO 12 detects that the authentication to the service providing server 40 is not yet completed, the C-SSO 12 carries out authentication proxy to the respective service providing servers 40 in place of the user (in step S111). This authentication is implemented with the authentication proxy information 64a being sent from the authentication proxy section 64 of the C-SSO 12 to the authentication section 42 of the service providing server 40.

When the authentication proxy is successfully carried out (in step S112), the request acquiring section 62, which has received this, relays the request from the Web browser 11 in step S107 (in step S113). When the service providing server 40 gives a response for this request (in step S114), the request acquiring section 62 of the C-SSO 12 relays this (in step S115) to return it to the Web browser 11. Thereby, on the screen of the Web browser 11, the HTML contents or the like corresponding to the request in step S107 is displayed (in step S116).

Figure 4:
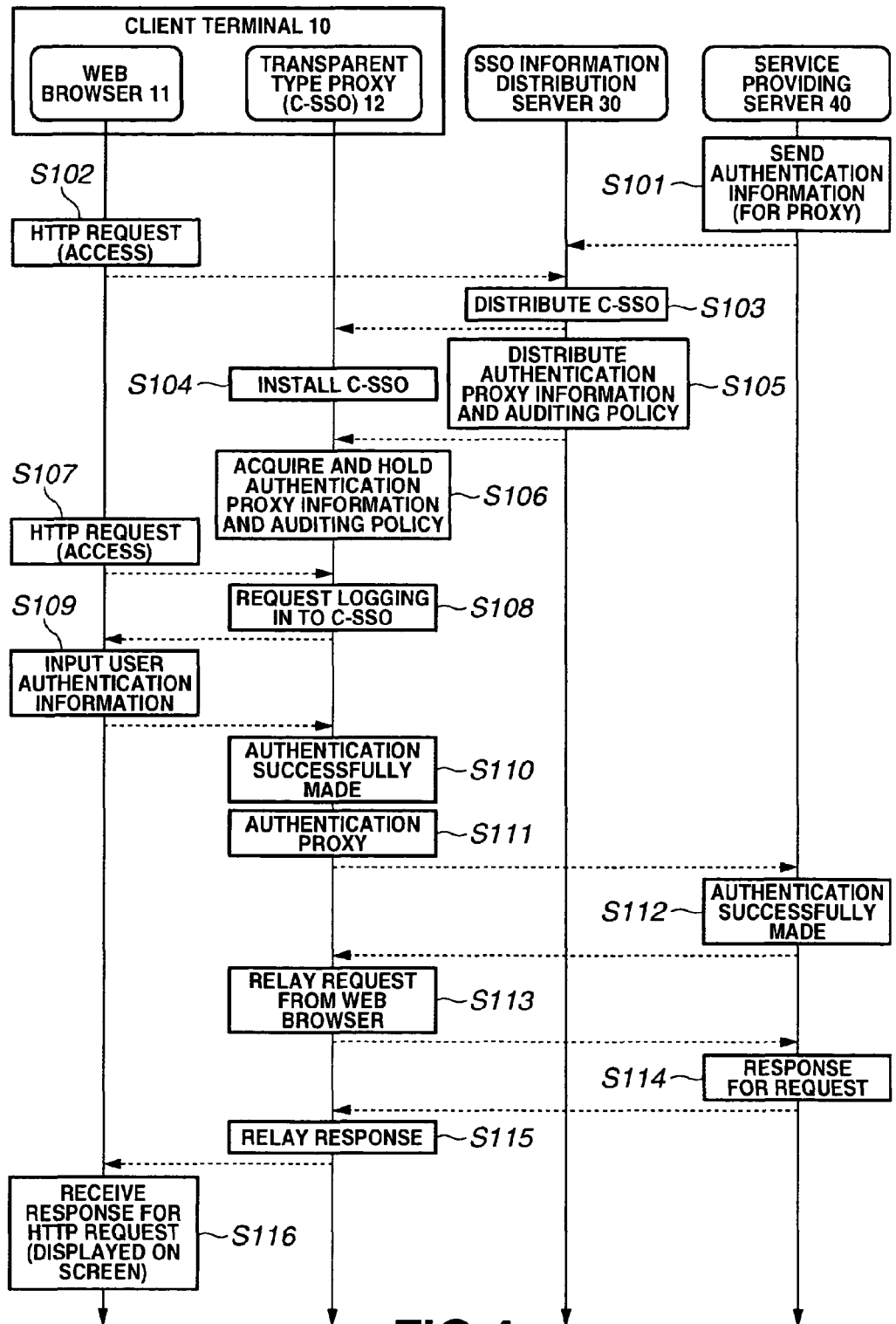
FIG. 4 is a sequence chart indicating a flow of a first processing in the information processing system as shown in FIG. 1 and FIG. 2.

Although it is not shown in FIG. 4, on the basis of the auditing policy 65a, the log output section 65 of the C-SSO 12 collects the log at the time when or after the request is received from the Web browser 11, and outputs it to the auditing server 20.

Next, with reference to FIG. 5, the flow of processing in the information processing system as shown in FIG. 1 and FIG. 2 will be described. Here, the flow of processing from the state in which the C-SSO 12 is already installed in the client terminal 10 will be described.

First, when the user tries to access the service providing server 40 from the client terminal 10, using the Web browser 11 (in step S201), the C-SSO 12 intercepts this request in the request acquiring section 62. If, at this time, the logging in to the C-SSO 12 is not completed, the user authentication section 61 displays a popup, or otherwise operates, to request the user to log in to the C-SSO 12 (in step S202).

The user inputs the user authentication information, such as the account, the password, and the like, (in step S203), and directs implementation of the user authentication. Here, when the authentication is successfully carried out (in step S204), the logging in to the C-SSO 12 is achieved.

Then, when the C-SSO 12 detects that the authentication to the service providing server 40 is not yet completed, the C-SSO 12 carries out authentication proxy to the respective service providing servers 40 in place of the user (in step S205). This authentication is implemented with the authentication proxy information 64a being sent from the authentication proxy section 64 of the C-SSO 12 to the authentication section 42 of the service providing server 40.

When the authentication proxy is successfully carried out (in step S206), the request acquiring section 62, which has received this, relays the request from the Web browser 11 in step S201 (in step S207). When the service providing server 40 gives a response for this request (in step S208), the request acquiring section 62 of the C-SSO 12 relays this (in step S209) to return it to the Web browser 11. Thereby, on the screen of the Web browser 11, the HTML contents, or the like, corresponding to the request in step S201 is displayed (in step S210).

Figure 5:
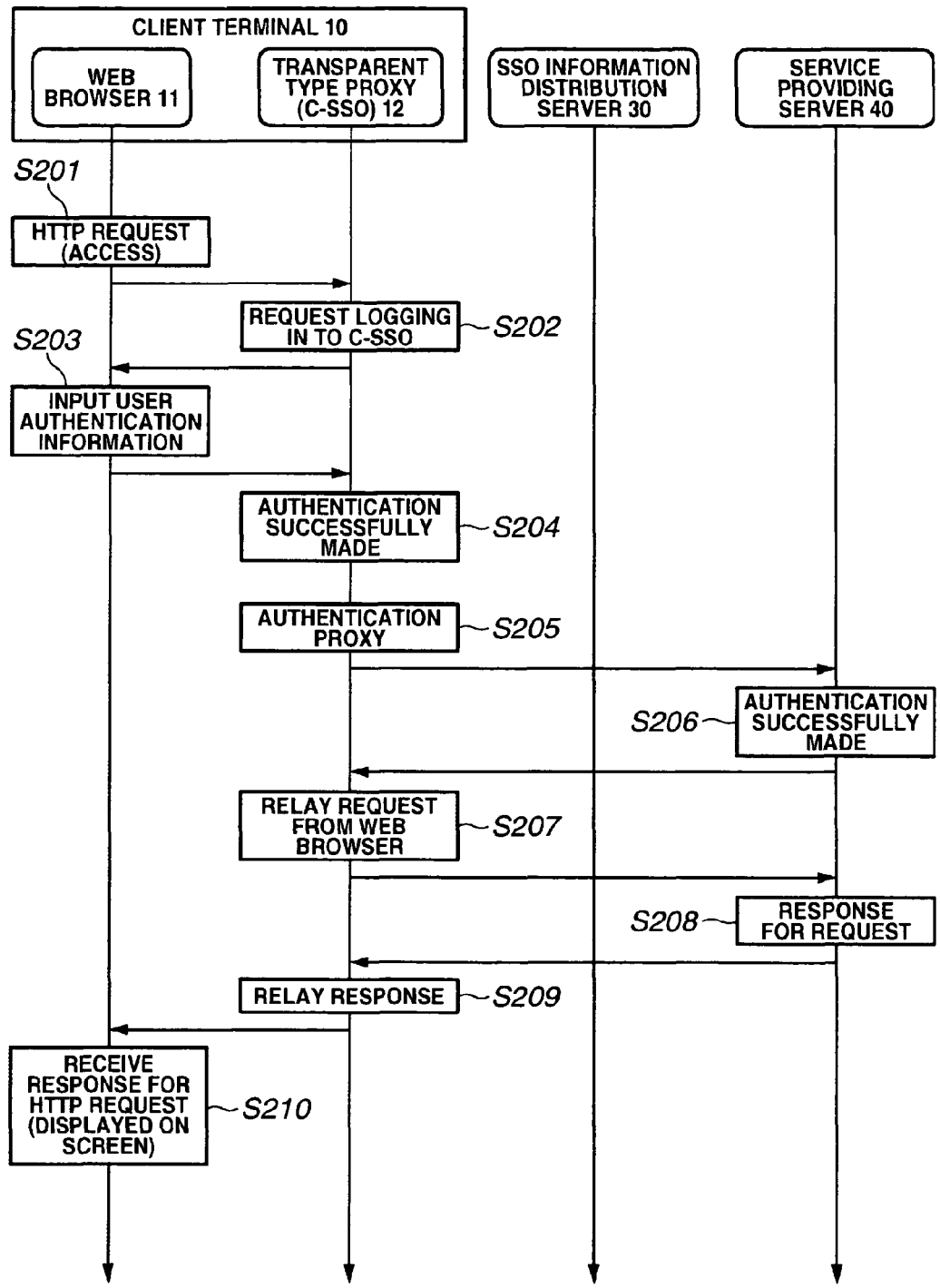
FIG. 5 is a sequence chart indicating a flow of a second processing in the information processing system as shown in FIG. 1 and FIG. 2.

Although it is not shown in FIG. 5, on the basis of the auditing policy 65a, the log output section 65 of the C-SSO 12 collects the log at the time when and after the request is received from the Web browser 11, and outputs the log to the auditing server 20.

Hereinabove, one example of the typical exemplary embodiment of the present invention has been described. However, the present invention is not limited to the exemplary embodiment as described above and illustrated in the charts, and may be modified within the scope and spirit of the claimed invention in exemplary embodiments.

For example, selection of validation/invalidation of the SSO function, and distribution of the authentication proxy information, the auditing policy, and the like, by the SSO information distribution server 30 may be carried out, utilizing an external recording medium, such as a USB (Universal Serial Bus) key.

In addition, in the above-described exemplary embodiment, the case where the processing is implemented by the information processing system pertaining to the present invention has been described. However, the system may be configured such that this processing is implemented by a control program installed in the computer. Such control program can be provided not only by the communication section, such as the network, or the like, but also can be provided, being stored in a recording medium, such as a CD-ROM, or the like.

The information processing system and the control program of the present invention is applicable to any information processing system with which, once the user receives authentication at first, the user can utilize all the functions which have been enabled with that authentication, and to any control program which causes a computer to implement this processing.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system, comprising:
an information distribution server;
a client apparatus; and
a service providing server that provides a service to a user of the client apparatus,
wherein the information distribution server comprises:
a user authentication information memory that stores user authentication information of the user, the user authentication information for authenticating the user on the client apparatus;
a receiving section that receives authentication information from the service providing server, the authentication information for authenticating the user on the service providing server; and
an authentication proxy information distributing section that distributes to the client apparatus authentication proxy information comprising the user authentication information and the authentication information, the authentication proxy information for authenticating a proxy on behalf of the user on the service providing server; and wherein the client apparatus comprises:
a user authentication section that authenticates the user using the distributed user authentication information, and
an authentication proxy section that, in response to the user requesting access to the service providing server, executes proxy authentication as the proxy to authenticate the user on behalf of the user on the service providing server using the authentication information included in the authentication proxy information distributed by the authentication proxy information distributing section.

2. The information processing system of claim 1, wherein the client apparatus further comprises:
an auditing policy acquiring section that acquires an auditing policy from the information distribution server, and
a log output section that outputs an auditing log on the basis of the auditing policy acquired by the auditing policy acquiring section.

3. The information processing system of claim 1, wherein the authentication proxy section is a transparent type proxy.

4. The information processing system of claim 2, wherein the authentication proxy section is a transparent type proxy.

5. A computer readable recording medium storing a control program causing a computer to execute a process for carrying out proxy authentication on behalf of a user, the process comprising:
storing user authentication information for authenticating the user on a client apparatus of the user;
receiving authentication information for authenticating the user on a service providing server;
distributing by the information distribution server, authentication proxy information comprising the user authentication information and the authentication information for authenticating a proxy on behalf of the user on the service providing server; and
executing the proxy authentication on the client apparatus to authenticate a proxy on behalf of the user on the service providing server, in response to the user requesting access to the service providing server, using the user authentication information included in the authentication proxy information.

6. The computer readable recording medium of claim 5, the process further comprising:
acquiring an auditing policy, and
outputting an auditing log on the basis of the acquired auditing policy.

7. The computer readable recording medium of claim 6, wherein the authentication of the user is carried out by a transparent type proxy.

8. The computer readable recording medium of claim 5, wherein the authentication of the user is carried out by a transparent type proxy.

9. An information processing system, comprising:
a client apparatus;
a plurality of information providing servers, comprising a first information providing server and a second information providing server, that provide services to a user of the client apparatus; and
an information distribution server that stores user client authentication information that authenticates the user on the client apparatus, receives proxy authentication information comprising first authentication information that authenticates the user on the first information providing server and second authentication information that authenticates the user on the second information providing server, and transmits the user client authentication information and the proxy authentication information to the client apparatus, wherein the client apparatus receives the user client authentication information and the proxy authentication information, authenticates the user using the client authentication information, and executes proxy authentication to authenticate the user on behalf of the user on at least one of the plurality of information providing servers using the proxy authentication information in response to the user requesting the client apparatus to access the at least one of the plurality of information providing servers.

* * * * *